United States Patent [19]

Lucey

[11] Patent Number: 4,524,654
[45] Date of Patent: Jun. 25, 1985

[54] MULTI-SPINDLE AUTOMATIC SCREW MACHINE

[76] Inventor: Leslie G. Lucey, 400 Rawlinson Rd., Rochester, N.Y. 14617

[21] Appl. No.: 399,446

[22] Filed: Jul. 19, 1982

[51] Int. Cl.³ .......................... B23B 3/34; B23P 23/00; B23G 1/08; B23G 1/20
[52] U.S. Cl. .......................................... 82/3; 29/38 B; 408/44; 10/130 WH; 10/132; 474/85; 474/87
[58] Field of Search ...................... 173/52; 82/3; 28 R; 474/85, 86, 87; 408/44, 45, 35; 29/38 B, 38 C, 38 D, 37 R, 36, 48.5, 33 J; 10/132, 130 R, 130 WH

[56] References Cited

U.S. PATENT DOCUMENTS

| | | | |
|---|---|---|---|
| 530,179 | 12/1894 | Hakewessell | 29/48.5 R |
| 1,234,685 | 7/1917 | Nielsen | 474/85 |
| 1,547,504 | 7/1925 | Le Boeuf | 29/38 D |
| 2,033,490 | 3/1936 | Simpson | 29/37 R |
| 2,837,935 | 6/1958 | Deliso | 29/38 B |
| 3,688,364 | 9/1972 | Ledergerber | 82/3 |
| 4,177,700 | 12/1979 | van der Horst | 82/3 |

FOREIGN PATENT DOCUMENTS 1097329 1/1968 United Kingdom ................. 474/85

Primary Examiner—Francis S. Husar
Assistant Examiner—William E. Terrell
Attorney, Agent, or Firm—Hoffman Stone

[57] ABSTRACT

A multi-spindle automatic screw machine having its principal working parts mounted on a weldment. A circular array of tool holders is mounted directly on top of the weldment, and a corresponding array of work spindles is mounted coaxially and in end-to-end confrontation with the tool holders upon a shaft cantilevered on the weldment.

3 Claims, 6 Drawing Figures

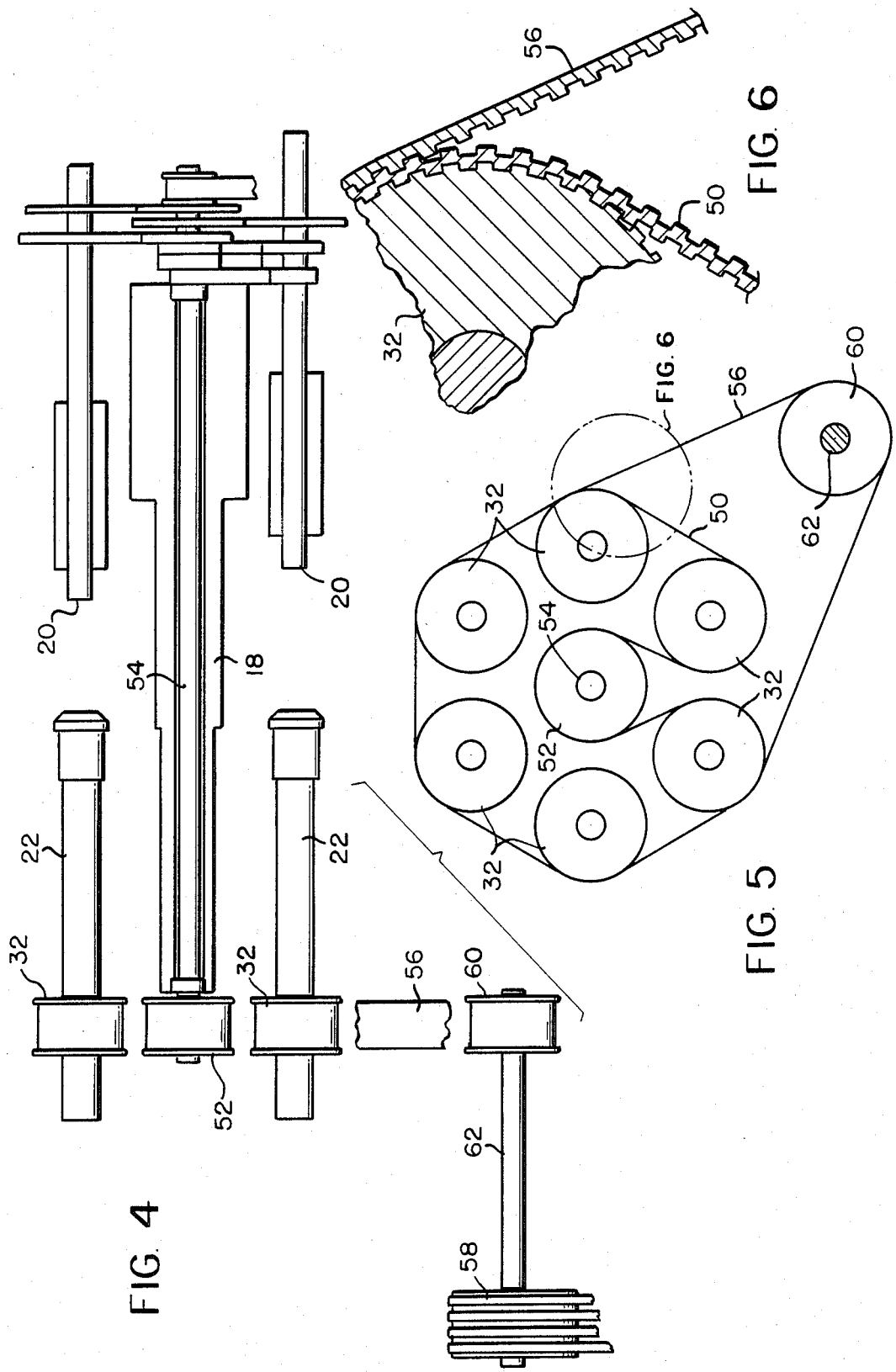

MULTI-SPINDLE AUTOMATIC SCREW MACHINE

This invention relates to a rotationally indexed multi-spindle automatic screw machine of novel construction, less expensive to build and quieter in operation than comparable machines heretofore available or proposed.

THE PRIOR ART

Automatic screw machines of the kind contemplated by the invention are sometimes referred to, or regarded as generally similar to multi-spindle turret lathes. They include a number of work spindles mounted in a turret for rotational indexing about a common central axis, and an equal number of tool holders in a fixed circular array each in end-to-end confrontation and coaxially aligned with a respective one of the work spindles. Means are provided for driving the work spindles and the tool holders in rotation about their respective longitudinal axes, for advancing the tool holders toward the work pieces held by the work spindles and retracting them when the designed work has been completed. Provision is also usually made for mounting other tools on cross-slides adjacent to the work spindles for special purposes such as, for example, drilling radially into or through a work piece.

One widely used machine of this kind heretofore available includes a large and heavy base casting with a central bore for mounting the turret, which is rim supported in the bore and rotatable in it. The bore must be accurately machined, and since it is of fairly large diameter, the machining step entails the use of a large mill and is relatively costly. The casting itself is quite heavy, so the cost of its material and of making it are also relatively high.

BRIEF DESCRIPTION

In accordance with a principal feature of the invention the bored base casting of the prior machine is eliminated. Instead, the working parts of the machine are mounted on relatively inexpensive weldments, and the work spindles are mounted at the distal end of a fixed shaft which is supported in cantilever fashion adjacent to its opposite end on the weldment that supports the tool holders. The word distal is intended to mean situated away from the point of attachment or origin, and in this case indicates an end portion of the shaft spaced from the supporting weldment. As much rigidity as desired may be incorporated in the fixed shaft to limit its deflection to any desired degree, and the work spindles are preferably supported on roller bearings, the inner races of which are fixed on the shaft.

A second feature of the invention relates to the use of twin timing belts for driving the work spindles and the transmission shaft that powers the tool holders. The first timing belt is trained around gears mounted at the rear ends of the work spindles and of the transmission shaft, engaging all of the gears. The second timing belt lies over the first one, engaging it along a relatively large part of its length, and connecting it to the prime power source, which is, typically, a ten horsepower electric motor.

DETAILED DESCRIPTION

A presently preferred embodiment of the invention will now be described in detail in conjunction with the accompanying drawings, wherein:

FIG. 4 is a side elevational view in diagrammatic form illustrating the power transmission arrangement in the machine;

FIG. 5 is a schematic diagram of the twin timing belt part of the power transmission arrangement; and FIG. 6 is an enlarged view of the portion of FIG. 5 included within the dashed circle 6 thereof.

Figure 1:
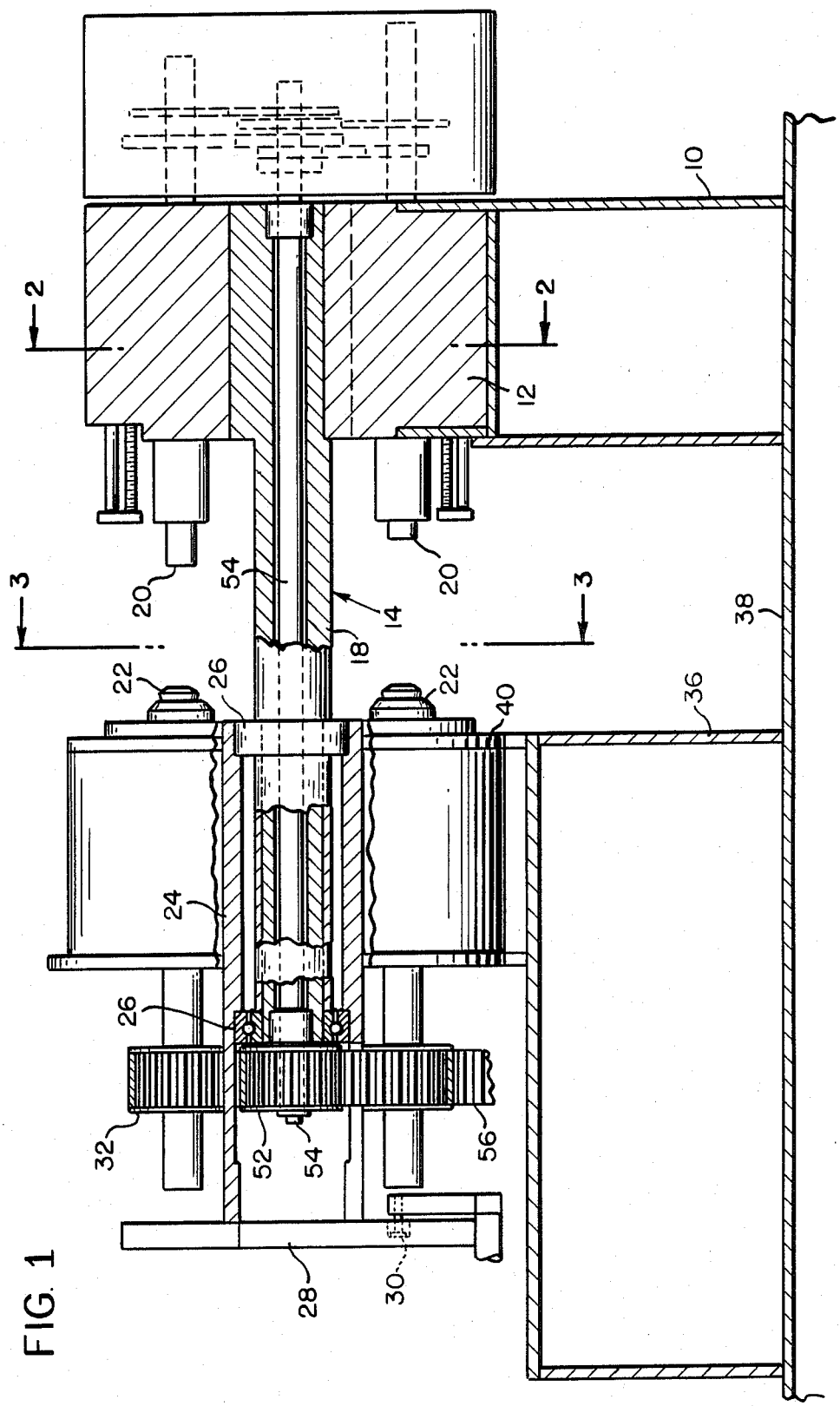
FIG. 1 is a side elevational view, partly in section, and with operative parts omitted, of an automatic, multi-spindle screw machine according to the invention.
Figure 2:
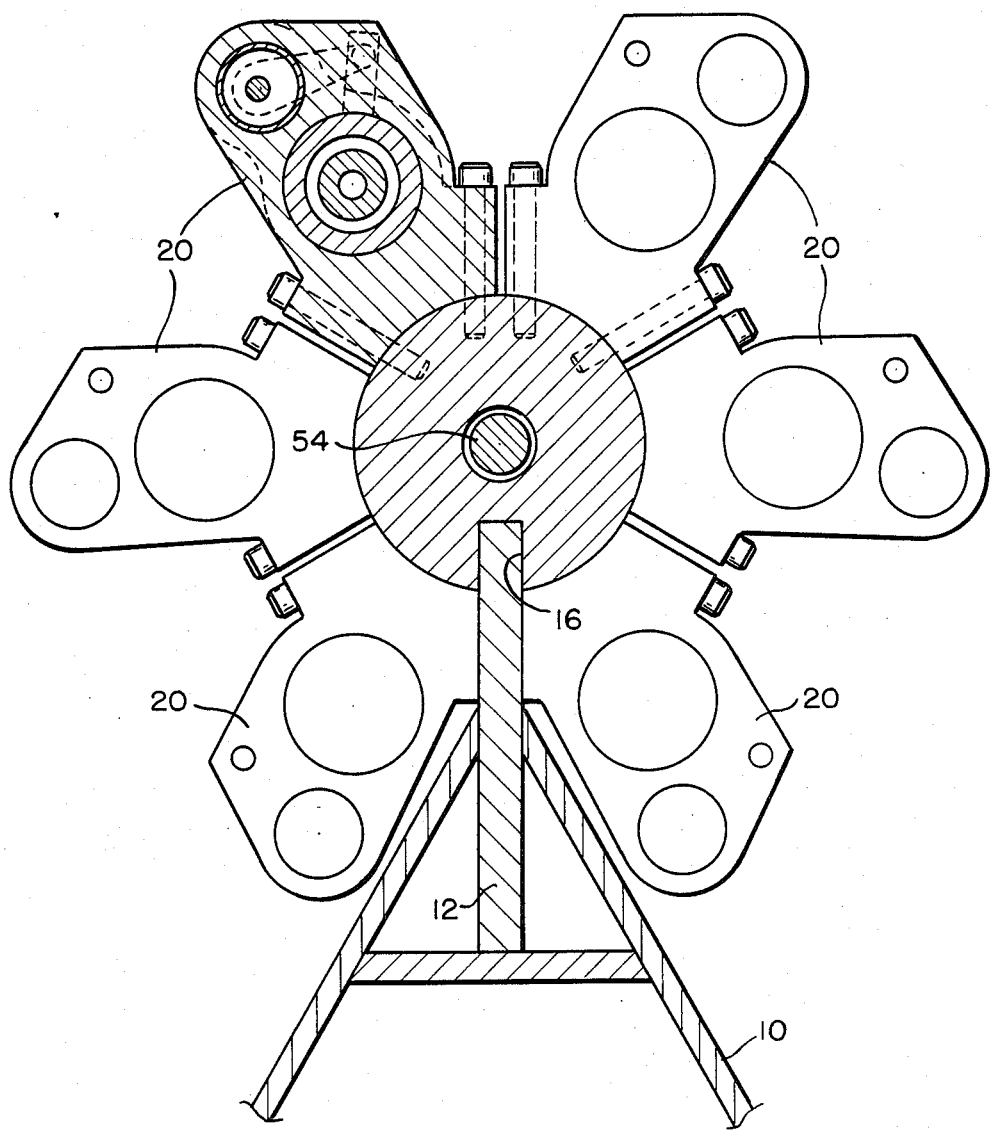
FIG. 2 is a cross-sectional view along the line 2—2 of FIG. 1, showing paticularly the mounting of the tool holders.

Referring first to FIG. 1, the support for the principal working parts of the machine is a weldment 10, which is topped by a vertical central plate 12. The fixed shaft 14 is welded or pinned to the plate 12, and preferably has a longitudinal slot 16 for receiving an upper portion of the plate. The right hand end portion of the shaft 14 is of larger diameter than the cantilevered portion 18 to allow for the depth of the slot 16 and for attachment of the tool holders 20.

The work spindles 22 are mounted on an annular support 24 which is journalled at the distal end of the fixed shaft 14, preferably on roller bearings 26. A radially slotted disc 28 is fixed to the distal end of the support 24 for indexing the work spindles 22 about the fixed shaft 14 by any desired means such as the Geneva motion arrangement suggested by the pin 30 shown in engagement with the disc 28.

Each of the work spindles 22 is connected through a clutch (not separately shown) to a drive gear 32 to be rotated about its own longitudinal axis. A detent arrangement (also not shown) is usually provided for locking each work spindle 22 against rotation when the clutch connecting it to the drive gear 32 is disengaged.

Figure 3:
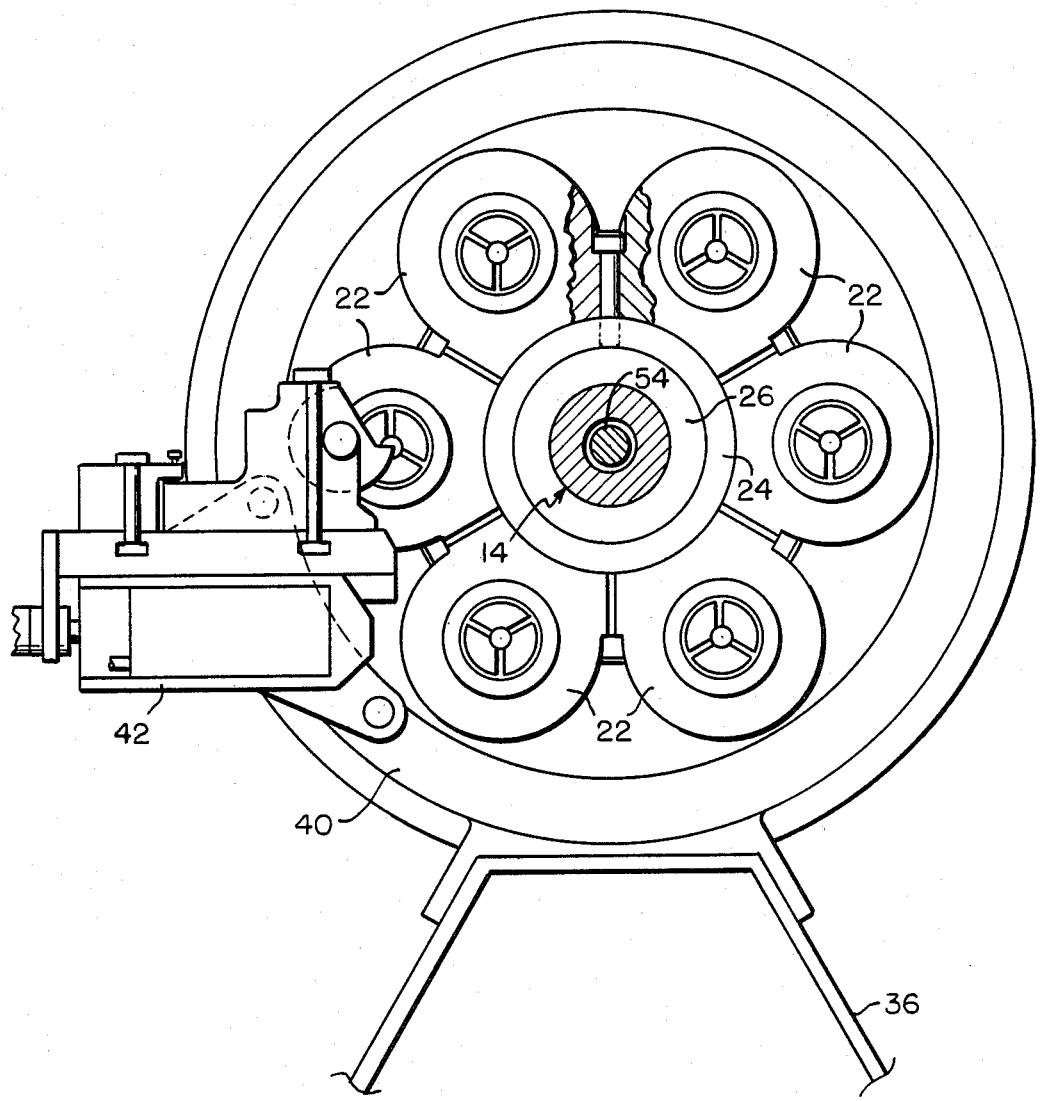
FIG. 3 is a cross-sectional view along the line 3—3 of FIG. 1, showing particularly the arrangement of the work spindles.

A second weldment 36, secured to a base plate 38, a part of which is also included in the first weldment 10, is mounted under the work spindles 22. A support ring 40, best shown in FIG. 3, is fixed on top of the second weldment 36. It extends around the work spindles 22 for supporting cross slides 42 (only one of which is indicated) at any work positions where it is desired to cut radially into the work pieces (not shown).

Referring now to FIGS. 5 and 6, which show the power input arrangement, a first timing belt 50 is trained around all of the work spindle drive gears 32 an also around a central drive gear 52. The first timing belt 50 carries teeth on both its inner and its outer faces. The central drive gear 52 is fixed at the end of a transmission shaft 54, which is rotable coaxially within the fixed shaft 14 to transmit power to the tool holders 20. A second timing belt 56 engages the outer face of the first belt 50, connecting it to the primary power source 58 through a gear 60 and a countershaft 62. The primary power source 58 is indicated merely as a gang of pulleys driven by V-belts, but it will be understood that the V-belts connect the pulleys to any desired basic source such as an electric motor, for example, through any desired speed reducing arrangement.

In accordance with conventional practice, speed and direction selection gears are mounted at the right hand ends of the tool holders for connecting them to the power transmission shaft 54.

Many operating parts of the machine have been omitted from the drawing and this description in the interest of presenting the principal novel elements of the invention in a clear and concise manner, and of avoiding the confusion that would otherwise be encountered if a detailed description of all the operations and variations were to be presented. Elements of the machine not described in detail herein are either conventional in nature or matters of striaghtforward engineering that will be be readily understood by those familiar with the art.

The principal features believed to be novel and nonobvious are the mounting of the work spindles 22 on the cantilevered central shaft 14, and the timing belt drive in the power transmission train.

The principal advantage of the timing belt drive is believed to be noise reduction relative to a gear drive. It should be understood that the timing belt drive, although novel and preferred, is not an essential feature of the invention so far as it relates to the cantilevered support means for the work spindles claimed in this application. Gears may be used to interconnect the work spindle drive gears 32 and the transmission shaft gear 52, and for the main power input as well, in accordance with the designer's choice. The timing belt drive is claimed in a companion application filed concurrently herewith, Ser. No. 399,445, and entitled, "Automatic Multi-Spindle Screw Machine with Timing Belt Drive" and now abandoned.

What is claimed is:

1. A multi-spindle automatic screw machine of the kind including a plurality of work spindles in a circular array upon a common hub and arranged to be indexed in rotation about a common, central axis, a plurality of tool holders equal in number to the work spindles, the tool holders being arranged in a circular array and in end-to-end confrontation with the work spindles, each one of the tool holders being coaxially aligned with a separate one of the work spindles, characterized in that the machine comprises a base support structure for supporting both the work spindles and the tool holders, means supporting the tool holders in angularly fixed positions relative to and atop the base support structure, an elongated shaft extending generally horizontally from the base support structure coaxially aligned with the common central axis of the work spindles and tool holders, and journal means for mounting the work spindles on the shaft near the distal end thereof spaced from the base support structure, said shaft constituting the principal direct support for the work spindles.

2. A multi-spindle automatic screw machine comprising a base support structure, an elongated shaft mounted by one of its end portions upon said base support structure and extending cantilever fashion horizontally therefrom, a plurality of tool holders, means mounting said tool holders in a fixed circular array coaxially around said shaft at the proximal end thereof, a plurality of work spindles equal in number to said tool holders, and journal means mounting said work spindles in circular array coaxially around said shaft at the distal end thereof for rotation upon the shaft, said shaft constituting the principal direct support for the work spindles, each of said work spindles being coaxially aligned and in end-to-end confrontation with a separate one of the tool holders in each operative position of the circular array of the work spindles.

3. A multi-spindle automatic screw machine according to either of claims 1 or 2 further including means for driving the tool holders and the work spindles in rotation about their respective central longitudinal axes.

* * * * *